United States Patent [19]

Champoux et al.

[11] 4,016,703
[45] Apr. 12, 1977

[54] COMBINATION OF A WEDGE HEAD PIN FASTENER AND OVERLAPPED WORK PIECES

[75] Inventors: Louis A. Champoux, Seattle; Joseph G. Falcioni, Tacoma, both of Wash.; Morton Mendels, Torrance, Calif.

[73] Assignee: The Boeing Company, Seattle, Wash.

[22] Filed: Apr. 10, 1975

[21] Appl. No.: 566,905

Related U.S. Application Data

[62] Division of Ser. No. 400,334, Sept. 24, 1973, abandoned.

[52] U.S. Cl. .................. 403/404; 85/9 R; 85/43; D8/387
[51] Int. Cl.² ............... F16B 35/06; F16B 5/00
[58] Field of Search .......... 52/617, 758 F; D8/264, D8/267; 285/211, 212; 85/9 R, 43, 37

[56] References Cited

UNITED STATES PATENTS

| | | | |
|---|---|---|---|
| 2,028,528 | 1/1936 | Sipe | 85/21 |
| 2,527,616 | 10/1950 | Beckstrom | 52/758 F X |
| 2,760,400 | 8/1956 | Mills et al. | 85/9 |
| 2,833,325 | 5/1958 | Larsy | 85/9 R |
| 2,955,505 | 10/1960 | Schuster | 85/37 X |
| 2,972,274 | 2/1961 | La Bombard et al. | 85/1 |
| 2,982,166 | 5/1961 | Hobbs | 85/41 |
| 3,295,404 | 1/1967 | Baker | 85/7 |
| 3,396,996 | 8/1968 | Raptis | 85/1 R |
| 3,512,446 | 5/1970 | Sekhon | 85/9 R |
| 3,560,124 | 2/1971 | Bergere | 85/7 |
| 3,574,080 | 4/1971 | Jones et al. | 85/9 R |
| 3,596,948 | 8/1971 | Spochr | 52/758 F |
| 3,748,948 | 7/1973 | Schmitt | 85/9 R |
| 3,792,933 | 2/1974 | Stencel | 85/7 |
| 3,840,980 | 10/1974 | Auriol | 85/37 |
| 3,849,964 | 11/1974 | Briles | 52/758 F |

FOREIGN PATENTS OR APPLICATIONS

| | | | |
|---|---|---|---|
| 211,683 | 1/1958 | Australia | 85/9 R |
| 29,802 | 12/1969 | Japan | 85/9 R |
| 997,733 | 7/1965 | United Kingdom | 85/9 R |
| 1,112,810 | 5/1968 | United Kingdom | 85/9 R |
| 28,425 | 12/1904 | United Kingdom | 85/37 |
| 318,736 | 9/1929 | United Kingdom | 85/37 |

OTHER PUBLICATIONS

Screws, Bolts and Nuts p. 150 "Handbook of Fastening and Joining of Metal Parts" 4/20/56.
"Quarter Million Lockbolt Fasteners Seal Wing Tanks" vol. 40, No. 7 Western Aviation 7/1960.

Primary Examiner—Leslie Braun
Attorney, Agent, or Firm—Christensen, O'Connor, Garrison & Havelka

[57] ABSTRACT

A pin fastening device having a double tapered head, the angle of one taper being on the order of 80°, or sufficient to withstand severe longitudinal forces, and the angle of the other taper being on the order of 10°, so as to provide a substantial interference fit between the pin and the work members. This double tapered head may be effectively utilized with a wide variety of pin fastener attachment end styles. Furthermore, an attachment end of a pin fastener is disclosed which includes a novel configuration of annular rings, which rings have a thread angle of 60°, and relatively small radii of curvature at their trough and peak. By having such a set of annular rings, one portion of the pin may be longitudinally extended sufficiently to give the pin large shear force resistance, while sufficient total ring surface is retained to withstand large tension forces. A single pin may thus have both a high shear and tension resisting capacity.

17 Claims, 4 Drawing Figures

COMBINATION OF A WEDGE HEAD PIN FASTENER AND OVERLAPPED WORK PIECES

This is a divisional of application Ser. No. 400,334, filed Sept. 24, 1973, now abandoned.

BACKGROUND OF THE INVENTION

The present invention relates generally to the art of pin fasteners.

Pin fasteners today have a wide variety of applications, but are extensively used in the aircraft industry, where rather severe strain-resisting capabilities are currently required. Futhermore, as aircraft design becomes more sophisticated, it is evident that fastening devices will be required to perform multiple functions. For instance, fasteners are being utilized to insure fuel tight fits for airplane fuel containers, as well as providing a tension or shear resistant connection between two members which are to be joined in some specified fashion.

Currently, to provide the required fuel and corrosion protection, high strain, flush-headed fasteners having a single, 100° included angled head are used in combination with a rubber-based sealant. The sealant provides the fuel seal and corrosion protection for the countersunk fasteners. However, this fastening combination has several disadvantages, including increased labor costs and added weight.

Although the single tapered, 100° pin fastener head may in some cases be designed to provide an inherent fuel seal, underhead corrosion still remains a significant problem, because there is not an adequate interference fit between the pin head and the walls of the opening in the member material. Additionally, fatique failures typically occur in the vicinity of the countersink, thus severely shortening the useful life of the airplane or member combination fastened by the pin.

With respect to the attachment end of prior art pin fasteners, the annular rings currently provided are widely separated, having a ring angle of approximately 45°, and rather large radii of curvature both at the trough of the thread, and at the head of the rings, to allow sufficient room for an appropriate number of the annular rings to be placed on a pin for tension strength, while maintaining the pin's overall weight at a minimum, the length of the shank portion of the bolt is decreased thus severely reducing the shear strength of the pin-pin collar combination. The prior art has thus been forced to utilize one pin configuration for shear strength, and another configuration for tension strength.

The present invention, however, significantly reduces these problems, insofar as it is double tapered wedge head bolt, having the capability of providing an adequate fuel seal and corrosion-free fastening without the use of sealants, as well as having the capability of withstanding both large shear and tension forces with minimum weight.

In accordance with the above, it is a general object of the present invention to provide a pin fastener which overcomes the disadvantages of the prior art.

It is another object of the present invention to provide a pin fastener which is capable of a controlled interference fit and which has a high resistance to tension forces.

It is a further object of the present invention to provide a pin fastener which is inherently capable of providing a fuel seal without the use of additional sealants.

It is still further object of the present invention to provide a pin fastener having a controllable interference fit.

It is a further object of the present invention to provide a pin fastener having sufficient head interference to resist underhead corrosion.

It is a still further object of the present invention to provide a combination of work members and pin fastener such that fatique life of the pin is increased.

It is yet another object of the present invention to provide a pin fastener which is capable of withstanding both high shear and high tension stresses.

Other and further objects, features and advantages of the invention will become apparent as the description proceeds.

SUMMARY OF THE INVENTION

In accordance with a preferred embodiment, the present invention includes a fastening pin, comprised generally of a number of portions, including a head portion having first and second circumferential tapered sections in the axial dimension of the head. Adjacent the head portion is a shank portion, and adjacent the shank portion is a circumferentially grooved securing portion. When the pin is pulled tight in use, the head engages one of the work members, the shank mates closely with the aligned openings in the work members, and a collar is swaged onto the rings of the securing portion to fasten and hold the subject work members tightly together. A breakneck portion and a griping portion are also provided sequentially axially adjacent the securing portion, so that the pin may be maintained in tension while swaging of the collar occurs. The breakneck portion allows the gripping portion to be easily removed from the remainder of the pin after swaging is completed. More specifically, in another aspect of the invention, the securing portion includes a configuration of annular rings having a relatively small radius of curvature for trough and peak, and a ring angle on the order of 60°.

DESCRIPTION OF THE DRAWINGS

A more thorough understanding of the invention may be obtained by a study of the following detailed description taken in conjunction with the accompanying drawings in which.

DESCRIPTION OF THE PREFERRED EMBODIMENT

Figure 2:
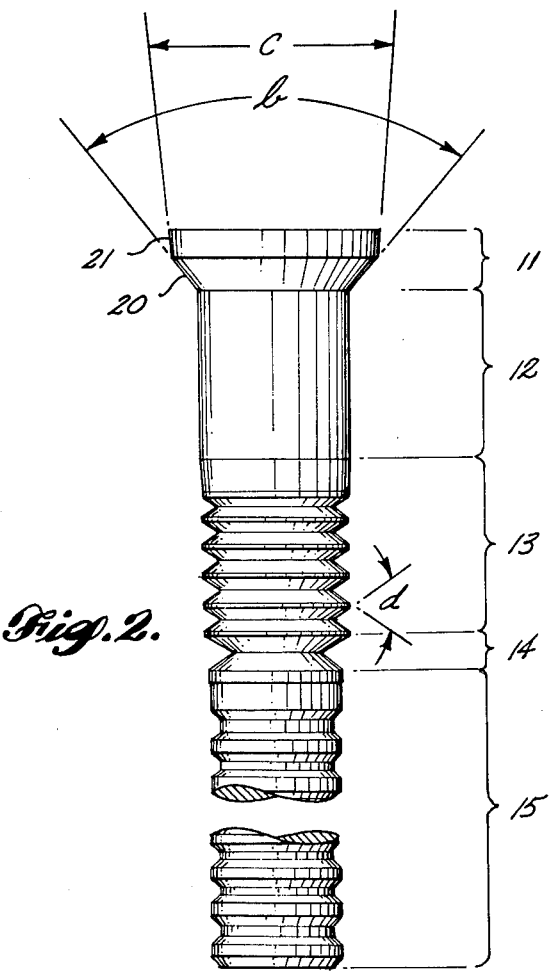
FIG. 2 is an elevation view of a pin fastener of the present invention.

Referring to FIG. 2, a pin fastener embodying the principles of the present invention is shown. A pin fastener is generally divided into four sections, and may be of varying length and diameter, depending on the size of the members which are to be fastened together. Although very prevalent in the aircraft industry, pin fasteners of this general type can be utilized as well in many other technologies. Furthermore, the pin fastener shown, although typically made from either steel or aluminum, can be made from a number of other substances, the particular material depending on factors such as cost, fabrication time, and the particular environment in which the fastener is to be used, as well as the functions which it must perform.

The general configuration of a pin fastener used in the aircraft industry includes five principal portions, denoted by numerals 11–15 in FIG. 2. The first portion of the pin fastener is the head 11, which is typically provided with a taper, and in the present invention with a double taper, so as to mate with a countersink surface in the upper work member. The portion 12 adjacent the head 11 is the shank of the pin, and is typically cylindrical The shank portion provides the shear strength of the pin. A third portion 13, adjacent the shank portion is the attachment or securing portion of the pin, which protrudes through the opening in the work members, and to which a collar is swaged, a technique of attaching a collar to a pin which is well-known to persons skilled in the art. After proper swaging of the collar onto the securing portion, significant structural rigidity of the combination consisting of fastener-work members-collar results. The number of rings in the securing portion determines the tension strength of the pin, as well as the force necessary to pull the pin out of the work members, known as pullout force. The larger the number of rings, the greater the tension stress resistance of the pin. For a tension-type pin, five such rings are typically provided, while a shear-type pin has typically only two rings, for attachment purposes only.

Figure 4:
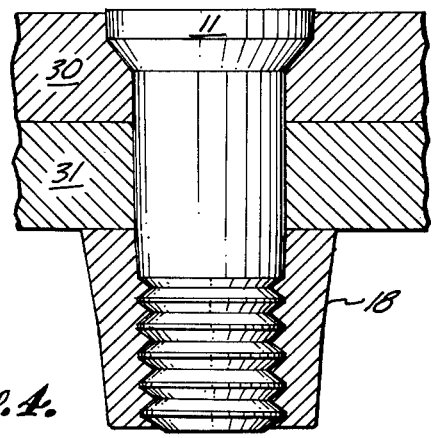
FIG. 4 is a cross-section view showing a completed fastening of two work members using the pin fastener of the present invention.

The last portion of the pin fastener is the pintail or gripping portion 15, which in use is gripped by a special swaging tool such that the pin and the work members may be pulled firmly together while collar swaging occurs. After the collar is in place, the gripping portion 15 is broken off at the backneck 14, and the fastening operation is completed. A completed combination is shown in FIG. 4. The work members 30 and 31 are now held together firmly by means of the countersunk head 11, and the swaged collar 18.

Figure 1:
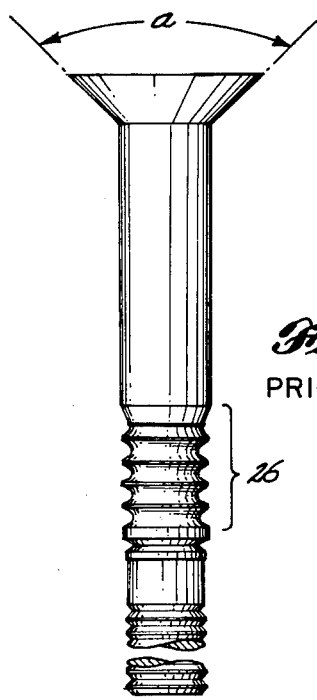
FIG. 1 is an elevation view of a prior art pin fastener.

In prior art pin fasteners such as shown in FIG. 1, there is only one tapered portion in the hand, the taper angle a typically being between 70° and 100°. This tapered portion mates with the countersunk surface of the upper work member and provides resistance against the head pulling through the opening when the combination is pulled tight.

This single taper of prior art fasteners is similar to the first taper 20 axially adjacent the shank portion 12 of the pin fastener of the present invention shown in FIG. 2. The first taper 20 has an angle b of 82° ± 0.5° in the present invention but as practical matter may vary substantially for example from 70° to 100° depending on application. A second taper 21, having an angle c of 10° ± 0.5° is provided axially adjacent the first taper 20, and extends to the top of the head 11. The significance of the double tapered head is explained in the following paragraphs.

It has been found that a single taper of 82°–100° will not provide a good interference fit between the head and a countersunk work member. An interference fit exists when the original outside dimension of the pin is larger than the original diameter of the opening in the work member into which the pin is to be fitted. Thus, when the head of the pin is forced into place in the opening, the opening is forcibly wedged outwardly, resulting in an extremely tight, "interference" fit between the pin head and the work member.

Such an interference fit is not possible with a large angle taper such as 80°, as this angle does not permit the wedging effect. It has been found by the applicants that this effect only occurs when the taper angle is on the order of 30° or less. Furthermore, taper angles between 20° and 30° have found to have certain disadvantages in that there is a resulting variance in the interference fit in the axial direction of the taper. This lack of positive control over interference decreases as the taper angle decreases. It has been found by the applicants that a taper angle on the order of 10° provides a high quality interference fit between the head of the pin and the work member. This interference fit provides inherent sealing between the work members and the pin, as well as corrosion resistance under the pin head.

However, this small angle taper, which is desirable for interference fit purposes, does not provide significant resistance to the pin being pulled through the opening in the work members. Thus, a second taper is provided to accomplish a high pullout resistance. The first taper 20 is located adjacent the shank portion 12 of the bolt to provide the necessary high pin pullout resistance.

Thus, by the use of a double taper configuration, one taper providing pullout resistance, and the other taper providing an interference fit, a pin fastener head is provided which improves corrosion protection for both head and countersink, provides a fuel sealing capability without the necessity of additional sealants, and provides an increased fatique life for the combination of pin and work members.

The interference fit for the head of the present invention is between 0.008 and 0.005 inches; i.e., the diameter of the head of the pin is between 0.005 and 0.008 inches larger than the original inside diameter of the opening in the work member. It has been found that a sufficient interference fit for fuel-tight purposes is 0.002 inches; however, the additional interference has been found by the applicants to increase the fatique life of the combination of pin and work member.

As noted above, given a predetermined thickness of work members, the shank length of the pin fastener of the prior art is determined by the kind of stress to which the pin is to be primarily subjected. If the pin combination is to undergo shear stress primarily, a long shank is provided, with a minimum securing portion length; i.e., the securing portion length is sufficient for two annular rings. If the pin combination is to undergo tension stress primarily, the shank portion is shortened, and the securing portion is slightly lengthened, so as to give space for a sufficient number of annular rings in the securing portion to resist the large tension stresses.

The configuration of the individual annular rings 26 at the securing end of the pin of the prior art is shown in FIG. 1. Because weight is often a critical parameter and must be minimized, the use of such a general ring configuration permits only two such annular rings at the securing end of a pin that is to be subjected to high shear stress. This number of annular rings provides only a minimum pin capacity to withstand tension stress, and thus such a pin can only be used for shear stress applications.

If a tension resisting pin is desired, more annular rings are required, and thus, as noted above, the shank portion is shortened slightly, and the securing portion lengthened to provide room for the rings. Five annular rings are typically provided in a tension resisting pin, such that when the collar is placed over the securing portion of the pin and swaged, sufficient contact results between the collar and the annular rings to provide a combination pin-collar with high tension stress resistance. However, as noted above, because the length of the shank portion is necessarily reduced because of weight considerations, the shear stress capacity of this type of pin is substantially impaired.

Thus, this pin is used when the stress on the pin and the work members is to be primarily tensional in nature. Thus, the ring configuration of prior art requires that two pins be manufactured, one for shear force applications and one for tension force applications.

The present invention, however, utilizes a novel configuration of annular rings at the securing portion of the pin fastener such that one pin is both shear and tension force resistant. By changing the thread angle d to substantially 60°, and decreasing substantially the radii of curvature of the trough and peak of the annular rings, (compare FIG. 2 with FIG. 1), a significantly greater number of annular rings may be formed in a securing portion of given axial length. Furthermore, by so changing the configuration of the rings, a greater inherent tension stress resisting capacity for each ring is achieved. The shank portion may thus be kept at a length equal to that of the prior art shear pin, while sufficient annular rings may be provided in a minimum length securing portion to provide large tension stress resistance. Thus, the overall length of the pin of the present invention is no longer than the length of present shear pins, but because of the novel ring configuration, a sufficient number of rings may be located in the securing portion to give the tension stress capacity of longer prior art tension pins. Thus, by utilizing the configuration of annular rings of the present invention, a pin fastener is provided whereby a single embodiment provides high resistance to both shear and tension forces, and has a minimum total length, and hence, weight.

Figure 3:
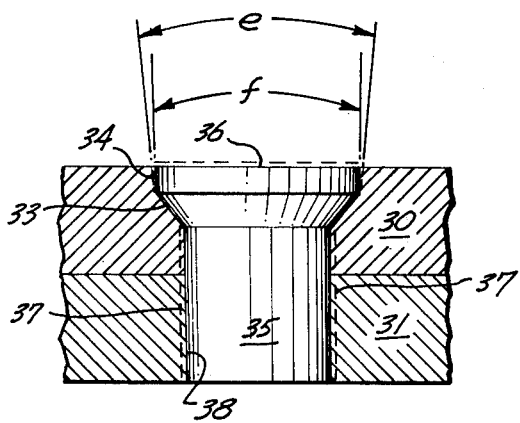
FIG. 3 is a cross-section view showing the positioning of a pin fastener of the present invention into a work member.

Referring to FIG. 3, the physical relationship between the pin and the work member conutersink and opening in use is shown. The work member comprises two metal sheets 30 and 31, which are to be tightly held together by the combination of the pin and collar. The head portion is double tapered as explained above, the first taper 33 axially adjacent the shank 35 having an angle of approximately 82°, and the second taper 34 adjacent the top surface 36 of the head having an angle e of approximately 10°. It has been found by the applicants that a countersink angle in work member 30 equal to the head taper angle of the pin will frequently result in material fatigue failures at the countersink site. These failures have been found to be due to fatigue from tension stresses produced at the countersink of the work member.

With respect to fatigue failures in general, it is a design goal to have such failures occur ultimately at the interface between the two sheets 30 and 31. By designing all other fatigue failures out, the pin and hence the combination will ultimately fail at the interface location, and the structural effect of the opening in the work piece is thus essentially eliminated. The highest fatigue capability of the combination with respect to a given pin fastener is thus achieved.

Such a result is achieved by countersinking that portion of the work member 30 which is to mate with the 10° head taper a few degrees than 10°. In the preferred embodiment this countersink angle f is on the order of 8°. The reduction of the countersink angle relative to the interference taper angle e of the head largely eliminates the fatigue failure problems due to stress at the top of the countersink, and thus significantly increases the fatigue life of the fastened combination.

Referring to FIG. 3, the dotted lines 37 show the dimensions of the pin fastener before insertion into the work piece while the solid lines 38 show the original interior surfaces of the machined countersink and opening in the work members 30 and 31. When the pin is forced through the members 30 and 31, the surrounding metal in the members is pushed out by the pin, thus providing the interference fit. The use of the smaller countersink angle f relative to the head taper angle e results in a fuel tight interference fit, and also shifts the effect of any stresses present at the countersink down into the shank portion of the pin, in the proximity of the interface between the two sheets 30 and 31. This results in a longer fatigue life of the combination of work members and pin fastener, as the stresses are now concentrated in that portion of the pin best able to withstand them.

Thus, a novel pin fastener for fastening various configurations of materials securely together has been disclosed. In one aspect, it includes a double tapered head portion, the angle of the taper adjacent the top of the fastener head being a few degrees greater than the countersink angle of the work member. This results in a fuel-tight fit without sealants, as well as a reduction of corrosion under the pin head, and a significant reduction of fatigue failures in the proximity of the countersink. Another aspect includes a novel configuration of annular rings at the attachment end of the pin, allowing one pin to be utilized for both shear and tension applications, and thus providing significant advantages and cost savings over the prior art.

Although an exemplary embodiment of the invention has been disclosed herein for purposes of illustration, it will be understood that various changes, modifications and substitutions may be incorporated in such embodiment without departing from the spirit of the invention as defined by the claims which follow.

What is claimed is:

1. A combination, comprising: a plurality of overlapped work members having an opening extending therethrough, a portion of said opening being a countersink, said countersink having first and second countersink sections, said first countersink section being positioned axially inwardly from said second countersink section and having a greater angle with respects to the axis of said opening than said second countersink section and said second countersink section having a taper angle of from 5° to 35°;

a fastening pin which comprises: a head having first and second tapered sections for engagement with said first and second countersink sections respectively, said first tapered section having a substantially larger taper angle than said second tapered section, said first tapered section having a taper angle sufficiently large to substantially prevent pull-through of said pin fastener in said opening upon engagement of said first tapered section with said first countersink section, said second tapered section having a taper angle of from 5° to 35°, said pin and said opening being sized such that an interference fit of from 0.002 to 0.008 inches results between at least a portion of said second tapered section and said second countersink section when said fastening pin is operatively positioned in said opening; and a shank depending from said head and receivable in said opening.

2. The combination of claim 1, wherein said head has an end face, and wherein said second tapered section is adjacent said end face, and first tapered section is adjacent said second tapered section, and said shank depends from said filter tapered section.

3. The combination of claim 1, including means engagable with said fastening pin for clamping together said work members, said work members being positioned between said head of said fastening pin and said clamping means.

4. The combination of claim 3, wherein said pin fastener includes a circumferentially grooved securing portion located axially adjacent said shank, said securing portion being substantially clear of said work members when said pin fastener is operatively positioned in said opening, and wherein said clamping means is a collar engagable with said securing portion.

5. The combination of claim 1 wherein said second countersink portion is enlarged in diameter at some location along its axial length from about 0.002 to about 0.008 inches when said pin is forced into its operative position.

6. The combination of claim 1 wherein said first countersink portion and said first tapered section have substantially equal taper angles.

7. The combination of claim 1 wherein the diameter of said shank exceeds the inside diameter of at least a portion of said opening whereby an interference fit is established between said shank and said opening when said pin is forced into its operative position.

8. The combination of claim 7 wherein said interference fit extends over the length of said opening containing said shank.

9. A combination comprising:

a plurality of overlapped work members having an opening extending therethrough, a portion of said opening being a countersink, said countersink having first and second countersink sections, each countersink section having a countersink angle; and a fastening pin which comprises: a head having an end face and first and second tapered sections for engagement with said countersink and a shank depending from said first tapered section and extending through said opening, said second tapered section being axially adjacent said end face, and said first tapered secion being axially adjacent said second tapered section, said first tapered section having a substantially larger taper angle than said second tapered section, said first tapered section having a taper angle sufficiently large to substantially prevent pull-through of said pin fastener in said opening, said second tapered section having a taper angle of from 5° to 35°, such that an interference fit results between at least said second tapered section and said second countersink section when said fastening pin is operatively positioned in said opening, said taper angle of said second tapered section being slightly greater than the countersink angle of said second countersink section.

10. The combination of claim 9, wherein said first tapered section has a taper angle of from 70° to 100°.

11. The combination of claim 10, wherein the taper angle of said second tapered section is on the order of 10°.

12. The combination of claim 11, wherein the taper angle of said first tapered section is on the order of 82°.

13. The combination of claim 11, wherein the countersink angle of said second countersink section is on the order of 8°.

14. The combination of claim 13, wherein the said countersink angle of said first countersink section is substantially equal to the taper angle of said first tapered section of said head of said fastening pin.

15. The combination of claim 9, wherein said second countersink section is enlarged in diameter from 0.002 to 0.008 inches at some location along its axial length when said pin is forced into its operative position.

16. The combination of claim 9 wherein the diameter of said shank exceeds the inside diameter of at least a portion of said opening whereby an interference fit is established between said shank and said opening when said pin is forced into its operative position.

17. The combination of claim 16 wherein said interference fit extends over the length of said opening containing said shank.

* * * * *

UNITED STATES PATENT AND TRADEMARK OFFICE
CERTIFICATE OF CORRECTION

PATENT NO. : 4,016,703
DATED : April 12, 1977
INVENTOR(S) : Champoux et al.

It is certified that error appears in the above-identified patent and that said Letters Patent are hereby corrected as shown below:

In Column 5, Line 41, delete "conutersink" and insert therefor -- countersink -- .

In claim 1, Column 6, Line 50, delete "respects" and insert therefor -- respect -- .

In claim 2, Column 7, Line 9, delete "filter" and insert therefor -- first -- .

Signed and Sealed this

Twenty-eighth Day of June 1977

[SEAL]

Attest:

RUTH C. MASON
Attesting Officer

C. MARSHALL DANN
Commissioner of Patents and Trademarks